United States Patent Office 3,497,523
Patented Feb. 24, 1970

---

3,497,523
METHOD OF NITRATING THIAZOLES
Goro Asato, Titusville, N.J., assignor to American Cyanamid Company, Stamford, Conn., a corporation of Maine
No Drawing. Filed Aug. 21, 1967, Ser. No. 661,788
Int. Cl. C07d 91/00
U.S. Cl. 260—302  8 Claims

ABSTRACT OF THE DISCLOSURE

Nitrated 2-lower alkyl thiazoles are prepared by reacting a 2-lower alkyl thiazole which has been previously complexed with either a Lewis acid or a strong mineral acid with a nitrating agent containing boron and fluorine in the presence of an inert solvent. Thiazoles prepared by this improved process exhibit blackhead activity per se, herbicidal activity, ad are also useful as intermediates in preparing bactericidal and fungicidal compounds.

BACKGROUND OF THE INVENTION

It is well known that 4-methyl- and 5-methyl-thiazoles undergo nitration with relative ease. However, 2-methyl-thiazole has only been nitrated in very low yield. For example, H. V. Babo and B. Prijs, Helv. Chem. Acta 33, 306 (1950) report the preparation of 2-methyl-5-nitrothiazole, melting point 131–133° C., in yields of only 3–4% through the use of fuming sulfuric and nitric acids at 330° C. Under milder conditions K Ganapathi and K. D. Kulkarni, Proc. Indian Acad. Sci. 37A, 758 (1955) obtained similar yields of what was presumably the same compound.

The practice of the present invention permits preparation of 2-methyl-4-nitrothiazole and 2-methyl-5-nitrothiazole in isolated yields up to 11.5% and 48% respectively. Furthermore, based on nuclear magnetic resonance and melting point data, there is a strong indication that the 2-methyl-5-nitrothiazole reported by Babo et al., was in reality 2-methyl-4-nitrothiazole (see Example 1) thereby indicating a lack of any practical prior art process for producing the 2-methyl-5-nitrothiazole.

SUMMARY OF THE INVENTION

It has been found that 2-methyl-4-nitrothiazole and 2-methyl-5-nitrothiazole may be prepared in yields substantially higher than those attained by prior art techniques and at relatively mild reaction conditions by complexing the reactant 2-methylthiazole with an anhydrous Lewis acid (molecules capable of coordinating with unshared electron pairs) such as boron-trifluoride, titanium tetrachloride, stannic chloride, aluminum chloride, or the like, or a strong mineral acid prior to contacting it with nitrating agents containing boron and fluorine such as nitroium tetrafluoroborate or boron trifluoride complexed nitrogen tetroxide. Other 2-lower alkyl nitrothiazoles may be prepared in a similar manner with the desired alkyl group present. The importance of the pre-nitration complexing of the reactant 2-methylthiazole is amply demonstrated by the fact that when uncomplexed 2-methyl-thiazole was reacted under identical conditions with the nitrating agents hereinabove mentioned, 2-methyl-5-nitrothiazole yields were only 8–19% as compared with an isolated yield of about 48% with boron trifluoride complexed 2-methylthiazole. The lower yields are believed to be due to nucleophilic attack of the nitrating agents by the uncomplexed 2-methylthiazole.

The reactivity of the complexed 2-lower alkylthiazoles, such as 2-methylthiazole is surprising since it would normally be assumed that such prior complexing would deactivate the heterocycle toward nitration. Furthermore, although the penetration acid complexing of 2-methyl-thiazole produces improved yields of the nitrated thiazoles, a similar effect is not observed when other similar cyclic compounds were complexed prior to nitration. For example, boron trifluoride complexed pyridine and 2-picoline gave only traces (1–2%) of nitrated products following nitration with boron trifluoride complexed nitrogen tetroxide.

DESCRIPTION OF THE PREFERRED EMBODIMENT

The 2-lower alkyl-4-nitrothiazoles and 2-lower alkyl-5-nitrothiazoles may be simultaneously prepared in appreciable isolated yields by reacting a 2-lower alkyl thiazole which, prior to the nitration reaction, has been complexed with either an enhydrous Lewis acid or a strong mineral acid, with a suitable nitrating agent in the presence of an inert solvent at temperatures of 0–100° C.

The 2-lower alkylthiazoles, such as for example, 2-methylthiazole and 2-ethylthiazole may be satisfactorily employed in the practice of this invention. The preferred Lewis acid is boron trifluoride while the preferred strong mineral acid is hydrochloric acid. In general, most of the usual nitrating agents are operable, however, highest yields are achieved with boron and fluorine containing agents such as nitronium tetrafluoroborate and boron trifluoride complexed nitrogen tetraoxide wherein the nitracting compounds tend to be highly reactive. Nitromethane is the preferred solvent although other solvents inert to the reactants, such as tetramethylene sulfone, are operable. While the reaction can be carried out at 0° to 100° C., the preferred temperature range of 20–40° C. provides the best reaction conditions.

It is an important feature of the invention that the 2-lower alkyl thiazoles be complexed with an acid such as described hereinbefore, prior to contact with the nitration agent, since otherwise the nitrating agents will be subjected to nucleophilic attack by the uncomplexed thiazole thereby destroying the nitrating agent and therewith the principal advantage of this invention.

The compounds prepared by this invention are useful intermediates in the preparation of bactericidal and fungicidal compounds as well as being effective anti-blackhead agents and herbicides as shown hereinafter. The present compounds are useful in preparing bactericidal and fungicidal compounds disclosed and claimed in copending application Ser. No. 598,209, filed Dec. 1, 1966.

DETAILED DESCRIPTION

The following examples are provided to illustrate the preparation and utility of the present process and compounds resulting therefrom but do not limit the invention to the specific embodiments described therein.

EXAMPLE 1

Preparation of 2-methyl-5- nitrothiazole and 2-methyl-4-nitrothiazoles

Into 150 ml. of nitromethane at $-10°$ C., 45 ml. of nitrogen tetroxide are added and boron trifluoride is introduced until the excess amount is observed at the top of the condenser. In a separate flask, 30 g. of 2-methyl-thiazole in 50 ml. of nitromethane are treated with excess boron trifluoride at $-20$ to $-10°$ C., and this solution is added in ½ hour with stirring to the above mixture at 5–25° C. After stirring at room temperature for 19½ hours, the mixture is poured on ice, made alkaline with 10% sodium hydroxide and then repeatedly extracted with six–100 ml. portions of methylene chloride. The extracts are dried with magnesium sulfate, filtered and evaporated to dryness under reduced pressure to give 37.55 g. of red-brown semi-solid. This mixture contains traces of starting material, and nitrated materials consisting of 22% of 2-methyl-4-nitrothiazole and 78% of 2-methyl-5-nitrothiazole by vapor phase chromatographic analysis. The mixture is then treated with ca. 150 ml. of carbon tetrachloride, filtered and evaporated to dryness to give 28.9 g. of yellow solid which melts at 62–68° C. This material is predominantly composed of 2-methyl-5-nitrothiazole and is further purified by recrystallization from methanol to give 2-methyl-5-nitrothiazole in 48% overall yield from 2-methylthiazole. The pure sample melts at 70.5–72.5° C.

*Analysis.*—Calculated for: $C_4H_4N_2O_2S$ (M.P. 70.5–72.5° C.). Theory: C, 33.32; H, 2.80; N, 19.43; S, 22,24. Found: C, 33.37; H, 2.98; N, 19.54; S, 22.11.

The carbon tetrachloride-insoluble solid contains predominantly 2-methyl-4-nitrothiazole, which is purified from methanol or hexane to give 5.06 g. of product (11.5% yield); the pure sample melts at 134–136° C.; analysis found for $C_4H_4N_2O_2S$ (M.P. 134–136° C.): C, 33.24; H, 2.97; N, 19.30; S, 22.10.

Approximately the same yield is obtained when the boron trifluoride-complexed nitrogen tetroxide is replaced by nitronium tetrafluoroborate. H. v. Babo and B. Brijs claim to have obtained 2-methyl-5-nitrothiazole from the fuming sulfuric-nitric acid nitration of 2-methylthiazole; however, their compound is actually the 2-methyl-4-nitro isomer as shown by its reported melting point of 131–133° C. The ring proton of 2-methyl-5-nitrothiazole exhibits a band at $1.53\tau$ in the nuclear magnetic resonance spectrum while the corresponding absorption of 2-methyl-4-nitrothiazole is at $1.80\tau$; these data agree with theoretical expectations.

EXAMPLE 2

The two nitrated products of Example 1 are similarly produced by following the procedure of Example 1 except that the nitromethane solvent is replaced by tetramethylene sulfone and the boron trifluoride complexed nitrogen tetroxide is replaced by nitronium tetrafluoroborate.

EXAMPLE 3

The nitrated products of Example 1 are produced in combined yield of 54% using the procedure of Example 1, except that the boron trifluoride complexed 2-methylthiazole is replaced by 2-methylthiazole hydrochloride.

EXAMPLE 4

The products, 2-ethyl-5-nitrothiazole and 2-ethyl-4-nitrothiazole, are prepared by following the procedure of Example 1 and replacing 2-methylthiazole with 2-ethylthiazole.

EXAMPLE 5

Blackhead activity of 2-methyl-5-nitrothiazole

Paterson-Cross cockerels received on day of hatch were maintained in chick growing batteries in rooms heated to appropriate temperatures. Water and feed were provided ad libitum. At six days of age, the birds were divided into equal weight groups of five or ten birds, placed in suspended wire cages, and the birds to be medicated received the test compound in the diet.

The birds were inoculated with 4000 embryonated ova of *Heterakis gallinarim* which were known to transmit *Histomonas meleagridis*, the etiological agent of blackhead, by previous passage in comparable birds. The test was terminated thirteen days after inoculation when the birds were weighed and killed to permit examination of the ceca and liver for lesions produced by the disease. The efficacy of the test compound in controlling liver and ceca lesions was measured by the assignment of a quantitative value in accordance with the following definitions:

LESION SCORING

Ceca: Numerical value
No gross lesions evident _____ 0.00
1–10 pinpoint lesions or 1–3 large lesions ___ 0.25
11–25 pinpoint lesions or 4–5 large lesions ___ 0.50
25% of ceca with lesions _____ 0.75
26%–50% of ceca with lesions _____ 1.00
More than 50% of ceca with lesions _____ 2.00

Liver:
No gross lesions evident _____ 0.00
1–10 pinpoints lesions or 1–2 large lesions ___ 0.25
11–25 pinpoint lesions or more than 2 large lesions _____ 0.50
26–50 pinpoint lesions or 25% of liver with large lesions _____ 1.00
More than 50 pinpoint lesions or more than 25% of liver with large lesions _____ 2.00

A summary of the anti-blackened efficacy data on 2-methyl-5-nitrothiazole is presented below in Table I.

TABLE I.—BLACKHEAD IN CHICKENS

| Medication drug | P.p.m. in diet | No. of chicks | Mean lesion score Ceca | Mean lesion score Liver | Grams gained 13 after inoculation |
| --- | --- | --- | --- | --- | --- |
| None (uninoculated) | | 10 | | | 261 |
| None (uninoculated) | | 10 | 1.55 | 0.035 | 224 |
| 2-methyl-5-nitrothiazole | 250 | 5 | 0.45 | 0.025 | 227 |

EXAMPLE 6

Description of testing for preemergence herbicidal activity

Preemergence herbicidal activity of the compounds of the instant invention is exemplified by the following tests wherein seeds of a variety of monocotyledonous and dicotyledonous plants are separately mixed in poting soil and planted on top of approximately one inch of potting soil in separate pint cups. Compounds to be tested are dissolved in water or in a small amount of an organic solvent and then dispersed in water in sufficient quantity to provide the equivalent of 10 or 15 pounds of test compounds per acre when they are sprayed with the prepared solutions for a predetermined time. After spraying, the cups are placed on greenhouse benches and cared for in the usual manner. Two to four weeks after treatment the test is terminated and each cup is examined to determine the effect of each compound on the various plant species. Each cup is rated according to the herbitoxicity index given below and the results of the tests are provided in table form below. It will be noted from an examination of the table that the compounds of the invention are effective preemergence herbicides against a variety of monocotyledonous and dicotyledonous plants.

Herbicidal activity or herbitoxicity index

9=100% reduction in stand
9−=1 or 2 stunted plants remaining
8=85− <100% reduction in stand
7=70− <85% reduction in stand
6=60− <70% reduction in stand
5=50− <60% reduction in stand
4=40− <50% reduction in stand
3=30− <40% reduction in stand
2=20− <30% reduction in stand
1=10− <20% reduction in stand
0=No apparent effect
$s$=Severe injury
$m$=Moderate injury
$t$=Trace to slight injury

EXAMPLE 7

Description of testing for postemergence activity

The postemergence activity of the compounds of the invention is examplified by the following tests wherein the test compounds are applied at various rates of application to a variety of monocotyledonous and dicotyledonous plants. The test compounds are dissolved in 50/50 acetone/water mixtures in sufficient quantity to provide the equivalent of 9 or 15 pounds per acre of compound when said solutions are sprayed on the plants for a predetermined time at a pressure of 30 p.s.i. After spraying, the plants are placed on greenhouse benches and cared for in the usual manner. Two to four weeks after spraying, all plants are examined and rated according to the Herbitoxicity Index set forth in the table above. The results are given in table form below and clearly indicate a high degree of postemergence activity.

| Compound | Lb./A treatment | BW | CT | JG | NS | QG | KO | LA | MU | PI | BA | CR | GRF | WO |
|---|---|---|---|---|---|---|---|---|---|---|---|---|---|---|
| 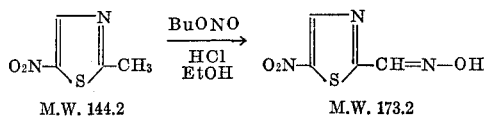 | 10 Post-emergence | 9s | 9 | n | t | 0 | m | m | 9 | 9 | t | t | 4 | t |
| O$_2$N—[thiazole]—CH$_3$ | 15 Pre-emergence | | | | | | 7 | 5s | 0 | 9 | 9 | 8 | 5 | 0 |
| | 15 Post-emergence | | | | | | 9 | 9 | 9 | 9 | 9 | 9 | 9 | m |
| | 9-Pre-emergence | | | | | | 8 | 8 | 7 | 9 | 8 | 8 | 8 | 0 |

BW—Bindweed; CT—Canada thistle; JG—Johnsongrass; NS—Nutsedge; QG—Quackgrass; KO—Kochia; LA—Lambsquarters; MU—Mustard; PI—Pigweed; BA—Barnyardgrass; CR—Crabgrass; GRF—Greenfoxtail; WO—Wild oats.

EXAMPLE 8

Preparation of 5-nitro-2-thiazolecarboxaldehyde oxime, an active bactericidal compound $$O_2N\text{-}[thiazole]\text{-}CH_3 \xrightarrow[\text{EtOH}]{\text{BuONO, HCl}} O_2N\text{-}[thiazole]\text{-}CH{=}N{-}OH$$

M.W. 144.2 → M.W. 173.2

In 10 ml. of absolute ethanol 1.16 g. (8 mmole) of 2-methyl-5-nitrothiazole is refluxed with 0.9 g. of 36% ethanolic hydrogen chloride and 1 g. of butyl nitrite. After 1¾ hours an additional 0.5 g. of butyl nitrite and 0.5 g. of ethanolic hydrogen chloride is added and refluxing continued for a total of 3¾ hours. The solution is cooled and evaporated under reduced pressure to give a red-brown oil. Ether is then added to the oil, the mixture filtered, and the ether filtrate treated with charcoal. The ether solution after filtration and evaporation leads to an oil. This is treated with petroleum ether and filtered. The petroleum ether-insoluble portion is dissolved in hot water, filtered, and cooled to give 0.2 g. (15%) of a white solid which gradually assumes a pale-brown color; melting point 149.5–151° C. Additional recrystallizations from water gave an analytical sample melting point 167–9° (decomposition).

*Analysis.*—Calcd. for C$_4$H$_3$N$_3$O$_3$S: C, 27.75; H, 1.75; N, 24.27; S, 18.52. Found: C, 27.90; H, 1.80; N, 24.10; S, 18.33.

I claim:
1. An improved process for the nitration of a compound selected from the group consisting of 2-methyl thiazole and 2-ethyl thiazole which comprises contacting an acid selected from the group consisting of strong mineral acids and Lewis acids, with the thiazole to form a complex and treating said complex with a nitrating agent selected from the group consisting of nitroniumtetrafluoroborate and boron trifluoride complexed nitrogen tetroxide in the presence of a solvent selected from the group consisting of nitromethane and tetramethylene sulfone, said nitration being carried out at a temperature within the range of about 0° C. to about 100° C.

2. The process according to claim 1, wherein boron trifluoride complexed 2-methylthiazole is reacted with boron trifluoride complexed nitrogen tetroxide in nitromethane solvent at 20–40° C.

3. The process according to claim 1, wherein boron trifluoride complexed 2-methylthiazole is reacted with nitronium tetrafluoroborate in nitromethane solvent at 20–40° C.

4. The process according to claim 2, wherein the solvent is tetramethylene sulfone.

5. The process according to claim 3, wherein the solvent is tetramethylene sulfone.

6. An improved process for the nitration of 2-methyl thiazole which comprises treating a strong mineral acid complexed 2-methyl thiazole with nitroniumtetrafluoroborate in the presence of nitromethane at temperatures within the range of 0 to about 100° C.

7. The process according to claim 6, wherein 2-methyl thiazole hydrochloride is reacted with nitronium tetrafluoroborate in nitromethane solvent at a temperature within the range of 20–40° C.

8. The process according to claim 1, wherein the nitrating agent is nitronium tetrafluoroborate.

References Cited

UNITED STATES PATENTS 3,162,675  12/1964  Olah et al. _____ 260—302

ALEX MAZEL, Primary Examiner

R. GALLAGHER, Assistant Examiner

U.S. Cl. X.R.

71—90; 260—688; 424—270